US012703922B2

(12) United States Patent
Li et al.

(10) Patent No.: US 12,703,922 B2
(45) Date of Patent: Aug. 11, 2026

(54) SINGLE-ATOM CATALYST FOR USE IN A WATER SPLITTING PROCESS AND A METHOD FOR PREPARING THE SAME

(71) Applicant: TECHNISCHE UNIVERSITÄT BERLIN, Berlin (DE)

(72) Inventors: Shuang Li, Berlin (DE); Arne Thomas, Dallgow-Döberitz (DE)

(73) Assignee: TECHNISCHE UNIVERSITÄT BERLIN, Berlin (DE)

( * ) Notice: Subject to any disclaimer, the term of this patent is extended or adjusted under 35 U.S.C. 154(b) by 671 days.

(21) Appl. No.: 18/028,505

(22) PCT Filed: Sep. 20, 2021

(86) PCT No.: PCT/EP2021/075804
§ 371 (c)(1),
(2) Date: Mar. 24, 2023

(87) PCT Pub. No.: WO2022/063724
PCT Pub. Date: Mar. 31, 2022

(65) Prior Publication Data

US 2023/0357937 A1 Nov. 9, 2023

(30) Foreign Application Priority Data

Sep. 24, 2020 (EP) .................................... 20198059

(51) Int. Cl.
*C25B 11/075* (2021.01)
*B01J 23/46* (2006.01)
(Continued)

(52) U.S. Cl.
CPC ........... *C25B 11/075* (2021.01); *B01J 23/462* (2013.01); *B01J 23/745* (2013.01); *B01J 23/755* (2013.01);
(Continued)

(58) Field of Classification Search
CPC . B01J 27/22; B01J 23/30; B01J 23/888; B01J 2531/66; B01J 23/36; B01J 23/755;
(Continued)

(56) References Cited

FOREIGN PATENT DOCUMENTS

CN 109621969 A 4/2019
CN 110054188 A * 7/2019 .............. B01J 27/22
(Continued)

OTHER PUBLICATIONS

Chee Kok Poh, San Hua Lim, Jianyi Lin, and Yuan Ping Feng, Tungsten Carbide Supports for Single-Atom Platinum-Based Fuel-Cell Catalysts: First-Principles Study on the Metal-Support Interactions and O2 Dissociation on WxC Low-Index Surfaces, The Journal of Physical Chemistry C 2014 118 (25), 13525-13538 (Year: 2014).*

(Continued)

*Primary Examiner* — Keling Zhang
*Assistant Examiner* — Remy Frederic Lalisse
(74) *Attorney, Agent, or Firm* — Maschoff Brennan

(57) ABSTRACT

A single-atom catalyst for use in a water splitting process includes at least one support material and at least one metal catalyst deposited on the surface of the at least one support material. The at least one support material is made of tungsten carbide obtained from a tungstate-metal-aryl compound precursor, and the at least one metal catalyst is selected from a group including Fe, Ni, Mn, Co, Cu, Zn, V, Ru, Ir, Ca, Pd, Pt or combinations thereof.

4 Claims, 12 Drawing Sheets

(51) Int. Cl.
*B01J 23/745* (2006.01)
*B01J 23/755* (2006.01)
*B01J 27/22* (2006.01)
*B01J 37/03* (2006.01)
*C25B 1/04* (2021.01)
*C25B 11/054* (2021.01)
*C25B 11/067* (2021.01)
*C25B 11/081* (2021.01)

(52) U.S. Cl.
CPC ............ *B01J 27/22* (2013.01); *B01J 37/031* (2013.01); *C25B 1/04* (2013.01); *C25B 11/054* (2021.01); *C25B 11/067* (2021.01); *C25B 11/081* (2021.01)

(58) Field of Classification Search
CPC ............. B01J 31/2265; B01J 2531/847; B01J 27/0515; B01J 2523/68; B01J 23/462; B01J 23/745; B01J 37/031; C07C 2523/30; Y02P 20/52; C25B 11/054; C25B 11/075; C25B 11/067; C25B 11/081; C25B 1/04
USPC ........................................................ 502/177
See application file for complete search history.

(56) References Cited

FOREIGN PATENT DOCUMENTS

| | | | | |
|---|---|---|---|---|
| CN | 110064410 A | * | 7/2019 | ............ B01J 27/051 |
| CN | 111001425 A | | 4/2020 | |
| CN | 111185176 A | | 5/2020 | |
| EP | 2413407 B1 | | 11/2017 | |

OTHER PUBLICATIONS

Machine translation of CN 110054188 A (Year: 2018).*
Machine translation of CN 110064410 A (Year: 2019).*
Machine translation of CN 109621969 (Year: 2018).*
Cao, L. et al. “Atomically dispersed iron hydroxide anchored on Pt for preferential oxidation of CO in H2.” Nature 565 (2019) 631-635. Jan. 31, 2019.
Fei, H. et al. “General synthesis and definitive structural identification of MN4C4 single-atom catalysts with tunable electrocatalytic activities.” Nature Catalysis 1 (2018) 63-72. Jan. 2019.
Fei, H. et al. “Single atom electrocatalysts supported on graphene or graphenelike carbons.” Chemical Society Reviews 48 (2019) 5207-5241. Jun. 11, 2019.
Fu, Q. “Active Nonmetallic Au and Pt Species on Ceria-Based Water-Gas Shift Catalysts.” Science 301 (2003) 935-938. Aug. 15, 2003.
Funke, H. et al. “Wavelet analysis of extended X-ray absorption fine structure data.” Physical Review B 71 (2005) 094110. Mar. 30, 2005.
Gu, J. et al. “Atomically dispersed Fe3+ sites catalyze efficient CO2 electroreduction to CO.” Science 364 (2019) 1091-1094. Jun. 14, 2019.
Hou, Y. et al. “Atomically dispersed nickel-nitrogen-sulfur species anchored on porous carbon nanosheets for efficient water oxidation.” Nature Communications 10 (2019) 1-9. Mar. 27, 2019.
Jones, J. et al. “Thermally stable single-atom platinum-on-ceria catalysts via atom trapping.” Science 353 (2016) 150-154. Jun. 9, 2016.
Kelly, T. G. and Chen, J. G. “Metal overlayer on metal carbide substrate: unique bimetallic properties for catalysis and electrocatalysis.” Chemical Society Reviews 41 (2012) 8021-8034. Jul. 18, 2012.
Kirlin, P.S. and Gates, B. C. “Activation of the C—C bond provides a molecular basis for structure sensitivity in metal catalysis.” Nature 325 (1987) 38-40. Jan. 1, 1987.
Koch, C.T. Determination of Core Structure Periodicity and Point Defect Density Along Dislocations. Dissertation, Arizona State Univ. 2002 May 2002.
Liu, P. et al. “Photochemical route for synthesizing atomically dispersed palladium catalysts.” Science 352 (2016) 797-801. Apr. 28, 2016.
Peng, Y. et al. “Carbon-Supported Single Atom Catalysts for Electrochemical Energy Conversion and Storage.” Adv. Mater. 30 (2018) 1801995. Aug. 21, 2018.
Qiao, B. et al. “Single-atom catalysis of COoxidation using Pt1/FeOx.” Nature Chemistry 3 (2011) 634-641. Aug. 2011.
Ravel, B. and Newville, M. “Athena, Artemis, Hephaestus: data analysis for X-ray absorption spectroscopy using IFEFFIT.” Journal of Synchrotron Radiation 12 (2005) 537-541. Apr. 21, 2005.
Seh, Z. W. et al. “Combining theory and experiment in electrocatalysis: Insights into materials design.” Science 355 (2017) eaad4998. Nov. 30, 2017.
Shan, J. et al. “Mild oxidation of methane to methanol or acetic acid on supported isolated rhodium catalysts.” Nature 551 (2017) 605-608. Aug. 15, 2018.
Shi, Q. et al. “Robust noble metal-based electrocatalysts for oxygen evolution reaction.” Chemical Society Reviews 48 (2019) 3181-3192. Jun. 2012.
Subbaraman, R. et al. “Trends in activity for the water electrolyser reactions on 3d M(Ni,Co,Fe,Mn) hydr(oxy)oxide catalysts.” Nature Materials 11 (2012) 550-557. Aug. 20, 2015.
Swierk, J.R. et al. “Electrochemical Study of the Energetics of the Oxygen Evolution Reaction at Nickel Iron (Oxy)Hydroxide Catalysts.” The Journal of Physical Chemistry 119 (2015) 19022-19029. Apr. 4, 1997.
Vidal, V. et al. “Metathesis of Alkanes Catalyzed by Silica-Supported Transition Metal Hydrides.” Science 276 (1997) 99-102. Nov. 29, 2016.
Wan, W. et al. “Reactions of water and C1 molecules on carbide and metalmodified carbide surfaces.” Chemical Society Reviews 46 (2017) 1807-1823. May 2018.
Xu, H. et al. “A universal principle for a rational design of single-atom electrocatalysts.” Nature Catalysis 1 (2018) 339-348. Jun. 18, 2018.
Yan, Z. et al. “Anion insertion enhanced electrodeposition of robust metal hydroxide/oxide electrodes for oxygen evolution.” Nature Communications 9 (2018) 1-9. Dec. 7, 2018.
Yang, L. et al. “Efficient oxygen evolution electrocatalysis in acid by a perovskite with face-sharing IrO6 octahedral dimers.” Nature Communications 9 (2018). Apr. 16, 2010.
Yin, Q. et al. “A Fast Soluble Carbon-Free Molecular Water Oxidation Catalyst Based on Abundant Metals.” Science 328 (2010) 342-345. Mar. 11, 2010.
Zhang, J. et al. “Insights into SingleMAtom Metai-Support Interactions in Electrocatalytic Water Splitting.” Small Methods 3 (2019) 1800481. Sep. 24, 2019.
Zhang, L. et al. “Selective Hydrogenation over Supported Metal Catalysts: From Nanoparticles to Single Atoms.” Chemical Reviews 120 (2020) 683-733. Jan. 13, 2017.
Poh Chee Kok et al, “Tungsten Carbide Supports for Single-Atom Platinum-Based Fuel-Cell Catalysts: First-Principles Study on the Metal-Support Interactions and O 2 Dissociation on W × C Low-Index Surfaces”, The Journal of Physical Chemistry C,vol. 118, No. 25, Jun. 26, 2014.
Zhang Qiaoqiao et al, “Atomically dispersed catalysts for hydrogen/oxygen evolution reactions and overall water splitting”, Jun. 18, 2020.
Song Donghoon et al, “Thin Nickel Layer with Embedded WC Nanoparticles for Efficient Oxygen Evolution”, ACS Applied Energy Materials,vol. 2, No. 5, May 28, 2019.
Ying Liu et al, “Evaluation of tungsten carbide as the electrocatalyst support for platinum hydrogen evolution/oxidation catalysts”, Mar. 10, 2012.
Seitz, L. C. et al. “A highly active and stable IrOx/SrIrO3 catalyst for the oxygen evolution reaction”. 2016, Science 353, 1011-1014.
Smith, R. D. L. et al. Photochemical Route for Accessing Amorphous Metal Oxide Materials for Water Oxidation Catalysis. Science. 340, 60-6, 2013.

(56) References Cited

OTHER PUBLICATIONS

Suntivich, J., May, K. J., Gasteiger, H. A., Goodenough, J. B. & Shao-Horn, Y. A Perovskite Oxide Optimized for Oxygen Evolution Catalysis from Molecular Orbital Principles. Science 334, 1383-1385, 2011.

Kanan, M. W. & Nocera, D. G. In Situ Formation of an Oxygen-Evolving Catalyst in Neutral Water Containing Phosphate and Co<sup>2+</sup>. Science 321, 1072-1075, 2008.

Dincă, M., Surendranath, Y. & Nocera, D. G. Nickel-borate oxygen-evolving catalyst that functions under benign conditions. Proceedings of the National Academy of Sciences 107, 10337-10341, 2010.

Toma, F. M. et al. Efficient water oxidation at carbon nanotube-polyoxometalate electrocatalytic interfaces. Nature Chemistry 2, 2010.

Zhao, Q., Yan, Z., Chen, C. & Chen, J. Spinels: Controlled Preparation, Oxygen Reduction/Evolution Reaction Application, and Beyond. Chemical Reviews 117, 2017.

Song, F. & Hu, X. Exfoliation of layered double hydroxides for enhanced oxygen evolution catalysis. Nature Communications 5, 4477, 2014.

Nong, H. N. et al. A unique oxygen ligand environment facilitates water oxidation in hole-doped IrNiOx core-shell electrocatalysts. Nature Catalysis 1, 841-851, 2018.

Bak, J., Bin Bae, H. & Chung, S.-Y. Atomic-scale perturbation of oxygen octahedra via surface ion exchange in perovskite nickelates boosts water oxidation. Nature Communications 10, 2713, 2019.

Jiang, J. et al. Atomic-level insight into super-efficient electrocatalytic oxygen evolution on iron and vanadium co-doped nickel (oxy)hydroxide. Nature Communications 9, 2885, 2018.

Yan, J. Q. et al. Single atom tungsten doped ultrathin alpha-Ni(OH)(2) for enhanced electrocatalytic water oxidation. Nature Communications 10, 2019.

Zhang, B. et al. Homogeneously dispersed multimetal oxygen-evolving catalysts. Science 352, 333-337, 2016.

Li, P. et al. Boosting oxygen evolution of single-atomic ruthenium through electronic coupling with cobalt-iron layered double hydroxides. Nature Communications 10, 1711, 2019.

Ying Liu et al. Evaluation of tungsten carbide as the electrocatalyst support for platinum hydrogen evolution/oxidation catalysts, Int. Journal of Hydrogen Energy, 37, 8929, 2012.

Song et al. Thin Nickel layer with embedded WO Nanoparticles for Efficient Oxygen Evolution, Applied Energy Materials, 2, 3452, 2019.

Li, Z. et al. Well-Defined Materials for Heterogeneous Catalysis: From Nanoparticles to Isolated Single-Atom Sites. Chemical Reviews 120, 2020.

Yang, X. F. et al. Single-Atom Catalysts: A New Frontier in Heterogeneous Catalysis. Accounts of Chemical Research 46, 1740-1748, 2013.

* cited by examiner

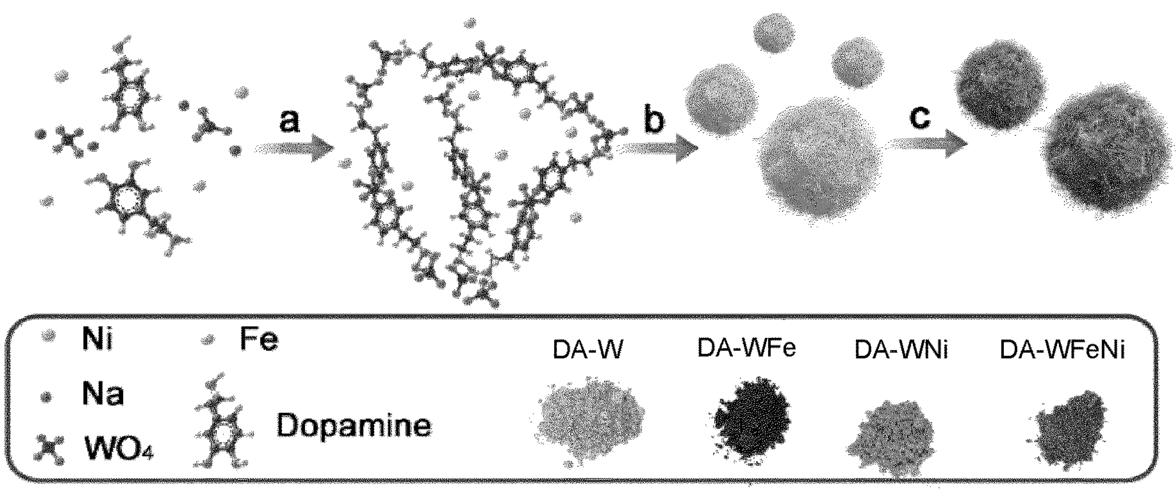
FIG 1a
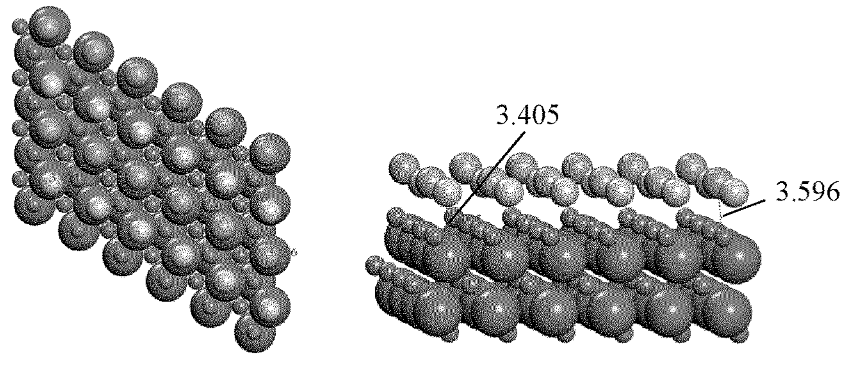
FIG 1b
FIG 1c

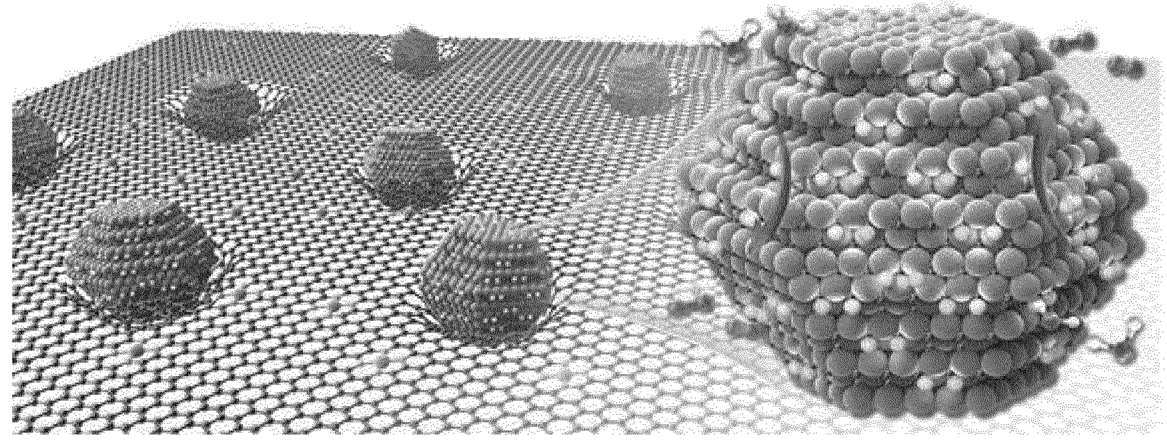
FIG 2a
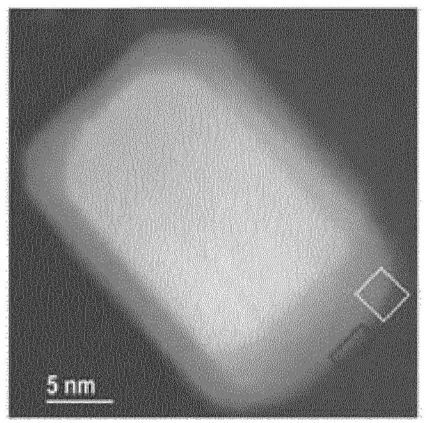
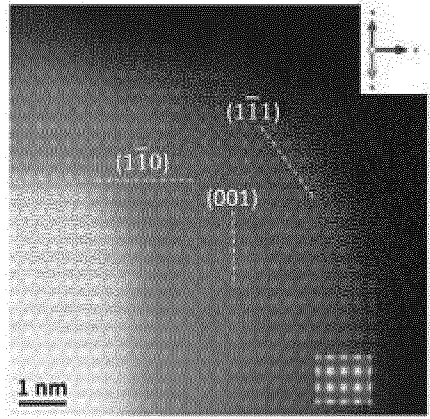
FIG 2b
FIG 2c

SINGLE-ATOM CATALYST FOR USE IN A WATER SPLITTING PROCESS AND A METHOD FOR PREPARING THE SAME

CROSS-REFERENCE TO A RELATED APPLICATION

This application is a National Phase Patent Application of International Patent Application Number PCT/EP2021/075804, filed on Sep. 20, 2021, which claims priority of European Patent Application Number 20 198 059.6, filed on Sep. 24, 2020.

The disclosure relates to a single-atom catalyst for use in a water splitting process, a method for preparing the same and an electrode comprising said catalyst.

BACKGROUND

Electrochemical water splitting is an attractive path for clean and large-scale hydrogen production. In the electrochemical process water is decomposed into oxygen and hydrogen in two sub-reaction: oxygen evolution reaction (OER) and hydrogen evolution reaction (HER) requiring an O—H-bond breakage.

The oxygen evolution reaction (OER) is seen as one bottleneck in this process, as it is kinetically slow and requires two steps of O—H bond breaking and subsequent O—O bond formation, including the transfer of four electrons (Seitz, L. C. et al. A highly active and stable IrOx/SrIrO3 catalyst for the oxygen evolution reaction. 2016, *Science* 353, 1011-1014). Therefore, a substantial overpotential (n) is required in OER to reach the desired current densities (>10 mA $cm^{-2}$). To reduce as much as possible the required overpotential, a highly active catalyst is demanded.

In the past decades, researchers have explored earth-abundant first-row (3d) transition-metal oxides, including 3d metal oxyhydroxides (Smith, R. D. L. et al. Photochemical Route for Accessing Amorphous Metal Oxide Materials for Water Oxidation Catalysis. *Science*. 340, 60-6, 2013), oxide perovskites (Suntivich, J., May, K. J., Gasteiger, H. A., Goodenough, J. B. & Shao-Horn, Y. A Perovskite Oxide Optimized for Oxygen Evolution Catalysis from Molecular Orbital Principles. *Science* 334, 1383-1385, 2011), metal phosphate composites (Kanan, M. W. & Nocera, D. G. In Situ Formation of an Oxygen-Evolving Catalyst in Neutral Water Containing Phosphate and Co<sup>2+</sup>. *Science* 321, 1072-1075, 2008), metal borate composites (Dincă, M., Surendranath, Y. & Nocera, D. G. Nickel-borate oxygen-evolving catalyst that functions under benign conditions. *Proceedings of the National Academy of Sciences* 107, 10337-10341, 2010), and molecular complexes (Toma, F. M. et al. Efficient water oxidation at carbon nanotube-polyoxometalate electrocatalytic interfaces. *Nature Chemistry* 2, 2010).

The OER performances of bi- or multi-metallic components based on iron (Fe), cobalt (Co), and nickel (Ni) are particularly promising (Zhao, Q., Yan, Z., Chen, C. & Chen, J. Spinels: Controlled Preparation, Oxygen Reduction/Evolution Reaction Application, and Beyond. *Chemical Reviews* 117, 2017). For instance, FeNi-LDHs (Song, F. & Hu, X. Exfoliation of layered double hydroxides for enhanced oxygen evolution catalysis. *Nature Communications* 5, 4477, 2014), $IrNiO_x$ (Nong, H. N. et al. A unique oxygen ligand environment facilitates water oxidation in hole-doped IrNiOx core-shell electrocatalysts. *Nature Catalysis* 1, 841-851, 2018), $LaNiO_3$ (Bak, J., Bin Bae, H. & Chung, S.-Y. Atomic-scale perturbation of oxygen octahedra via surface ion exchange in perovskite nickelates boosts water oxidation. *Nature Communications* 10, 2713, 2019), Fe—V-doped $Ni(OH)_2$ (Jiang, J. et al. Atomic-level insight into super-efficient electrocatalytic oxygen evolution on iron and vanadium co-doped nickel (oxy) hydroxide. *Nature Communications* 9, 2885, 2018), W-doped $Ni(OH)_2$ (Yan, J. Q. et al. Single atom tungsten doped ultrathin alpha-Ni(OH)(2) for enhanced electrocatalytic water oxidation. *Nature Communications* 10, 2019), FeCoW hydroxide (Zhang, B. et al. Homogeneously dispersed multimetal oxygen-evolving catalysts. *Science* 352, 333-337, 2016), and Ru—FeCo oxide Li, P. et al. Boosting oxygen evolution of single-atomic ruthenium through electronic coupling with cobalt-iron layered double hydroxides. *Nature Communications* 10, 1711, 2019) have garnered significant interest due to their encouraging OER overpotentials. CN 109621969A describes a mixture of W3C nanoparticles and Ni2W4C alloys on carbon fibers. Ying Liu et al. (Evaluation of tungsten carbide as the electrocatalyst support for platinum hydrogen evolution/oxidation catalysts, *Int. Journal of Hydrogen Energy,* 37, 8929, 2012) describes WC supported Pt nanoparticles (~5 nm Pt nanoparticles) as catalyst. Song et al. (Thin Nickel layer with embedded WO Nanoparticles for Efficient Oxygen Evolution, Applied Energy Materials, 2, 3452, 2019) refers to a catalyst for oxygen evolution made a metallic Ni layer on WC support. However, there is still a massive area for further improving the performances of current OER catalysts.

The most promising approach to maximize the atomic utilization rates and synergistic effects between active sites is to disperse the catalytically active metal compounds down to the atomic level, i.e. to prepare single-atom catalysts.

Currently, most of the single-atom catalysts are based on carbonaceous substrates (amorphous carbon, graphene, carbon nanotubes, carbon nitrides, etc.) as metal-$N_x$—$C_y$ moieties with isolated metal atoms coordinated by intrinsic defects or heteroatoms (Li, Z. et al. Well-Defined Materials for Heterogeneous Catalysis: From Nanoparticles to Isolated Single-Atom Sites. *Chemical Reviews* 120, 2020). These metal-$N_x$—$C_y$ catalysts show significant improvements in electrocatalytic reduction reactions, like $O_2/CO_2/N_2$ reduction and $H_2$ evolution reactions (Yang, X. F. et al. Single-Atom Catalysts: A New Frontier in Heterogeneous Catalysis. *Accounts of Chemical Research* 46, 1740-1748, 2013).

However, when applied in OER, such catalysts show insufficient activity and durability, as the formation of heteroatom bonds changes the electronic environment (d-band center) of the metal atoms through the ligand effects, which is highly correlated with adsorbate binding energy and thus unfavorably influence the catalytic activity. Furthermore, the carbonaceous matrix can be slowly oxidized under high potential, which results in the low durability of the catalysts.

SUMMARY

It is therefore an object underlying the proposed solution to overcome these disadvantages and to develop highly durable and conductive support materials with well-defined structures that can stabilize metals as single atoms without the aid of strong heteroatom-coordination.

This object has been solved with a catalyst having features as described herein.

Accordingly, a single-atom catalyst, for use in a water splitting process is provided that comprises at least one support material and at least one metal catalyst deposited on the surface of the at least one support material.

According to the proposed solution the at least one support material is made of tungsten carbide obtained from a tungstate-metal-aryl compound-precursor, and the at least one metal catalyst is selected from a group comprising Fe, Ni, Mn, Co, Cu, Zn, V, Ru, Ir, Ca, Pd, Pt or combinations thereof.

The catalyst of the proposed solution uses a transition-metal carbides (TMCs) as support materials to stabilize atomic or bi-atomic metals (such a Fe, Ni, and FeNi and others) to yield highly efficient single-atom OER and HER catalysts. Since the group 4-6 TMCs typically display extreme hardness, defined bulk structures, high thermal stability, chemical corrosion resistance, and metal-like electric conductivity, they are considered as a suitable support material.

Tungsten carbide is an especially interesting material in this respect, since it displays similar surface electronic states to noble metals. Thus, tungsten carbide is able to stabilize oxygen-evolving catalytic single-atom metal sites as well as hydrogen-evolving catalytic single-atom metal sites.

As described in more detail further below the metal-tungsten carbide catalyst is obtained by firstly synthesizing a dopamine tungstate complex with trace amounts of a suitable metal such as Fe, Ni, or FeNi by a precipitation reaction. In the course of the synthetic process dopamine molecules firstly coordinate with the metal ions such as Fe and Ni ions, which then assemble with tungstate ions to form metal-organic compounds as yellow-green powders.

After thermal treatment of these precursors, metal-tungsten-carbide catalyst such as $WC_x$—Fe, $WC_x$—Ni, $WC_x$—FeNi, $WC_x$—Ru, $WC_x$—RuNi are obtained. The resulting metal-tungsten-carbide catalyst possess a thin layer of single-atom sites supported by the tungsten carbide and exhibit superior catalytic activity and durability. It has been found that the calcination temperature has an impact on the final catalytic performance. For example, suitable calcination temperatures are between 70° and 1000° C., preferably at 800° C. or 900° C.

The tungsten carbide $WC_x$ structure of the present single atom catalyst is highly ordered. Thus, the single metal atoms are supported by or arranged on a highly ordered $WC_x$ surface. The single atoms form an ordered lattice on the $WC_x$ surface; i.e a highly crystallized structure. This is shown by TEM results. The single atoms in the present catalyst differ from well-known carbo supported single atoms (Adv. Mater. 2018, 30, 1801995), i,e the single atoms of the present catalyst are not carbon supported.

Tungsten carbides are ideal support materials to stabilize metal atoms such as FeNi or RuNi for high-performance OER and HER catalysis. The structural analysis suggests that these atomically dispersed metal atoms such as FeNi or RuNi atoms are weakly bonded on the surface of $WC_x$ nanocrystallites instead of inserted in the crystal or replacing W/C atoms. The high oxygen-evolving/hydrogen-evolving catalytic activities are originated from a synergistic effect between different metal sites.

It is important to note that the metal atoms do not form a bulk layer on the support material. Furthermore, the present catalyst does not contain fiber, is not arranged on fibers or supported by fibers, such as carbon fibers.

As mentioned above the present catalyst can be used in water splitting for oxygen evolution reaction (OER) and hydrogen evolution reaction (HER)

Oxygen Evolution Reaction (OER)

It has been found that in case the present catalyst comprises one of Fe, Ni or FeNi, in particular FeNi, as metal catalyst, such a tungsten carbide supported metal catalyst shows improved properties in catalyzing oxygen evolution reaction (OER) in a water splitting process.

In an embodiment the present OER catalyst shows an overpotential n (10 mA/cm$^2$, alkaline solution) of less than 300 mV, preferably less than 250 mV, more preferably less than 230 mV.

In a further embodiment the present OER catalyst shows a turnover frequency TOF (n=300 mV) of at least $0.04^{s-1}$, preferably at least $0.3^{s-1}$, more preferably of at least $1^{s-1}$, even more preferably of at least $2^{s-1}$, such as $2.18^{s-1}$.

In a variant the present OER catalyst can be described as WCx-Fe, WCx-Ni, WCx-FeNi, wherein WCx-FeNi is the most preferred one.

$WC_x$—Ni requires an overpotential of 275 mV at 10 mA cm$^{-2}$, which is 136 mV lower than that of $WC_x$—Fe. However, when Fe and Ni are introduced simultaneously, the $WC_x$—FeNi requires an overpotential of only 237 mV at 10 mA cm$^{-2}$, which is much lower than for $WC_x$—Fe, $WC_x$—Ni, and bare $WC_x$, demonstrating that the high OER activity results from a synergistic effect of Fe and Ni sites.

In particular, $WC_x$—FeNi shows a low overpotential of 201 mV at 10 mA/cm$^2$, high turnover frequency (TOF) values of 2.18 s$^{-1}$ (n=300 mV), and superior durabilities (at least 130 h) under different working currents.

In yet a further embodiment of the present OER catalyst the amount of metal catalyst may vary. For example, the amount of Fe and Ni may be in each case anywhere between 0 at % and 1 at %, preferably between 0.25 at % and 1 at %, more preferably between 0.25 at % and 0.5 at %. For example, the present catalyst may be one of: $WC_x$—$Fe_{0.5}Ni_0$, $WC_x$—$Fe_{0.5}Ni_{0.25}$; $WC_x$—$Fe_{0.25}Ni_{0.5}$; $WC_x$—$Fe_{0.5}Ni_{0.5}$; $WC_x$—$Fe_{0.5}Ni_1$; $WC_x$—$Fe_1Ni_{0.5}$; $WC_x$—$Fe_0Ni_{0.5}$, The most preferred variant are $WC_x$—$Fe_{0.5}Ni_{0.5}$ and $WC_x$—$Fe_{0.5}Ni_1$.

If the Fe amount is fixed at 1 at %, the lowest overpotential of the catalyst is reached by $WC_x$—$Fe_{0.5}Ni_{0.5}$ (237 mV) and $WC_x$—$Fe_{0.5}Ni_1$ (236 mV). If the Ni amount is fixed to 0.5 at. %, the overpotential decreases along with increased Fe ratio and reaches to the lowest overpotential of 237 mV at 0.5 at. % Fe ratio ($WC_x$—$Fe_{0.5}Ni_{0.5}$), which then increases to 247 mV, when further increasing the Fe amount to 1.0 at. % ($WC_x$—$Fe_1Ni_{0.5}$).

As mentioned above, the calcination temperature has also an influence on the catalytic activity of the catalyst. Thus, in an embodiment a metal-tungsten carbide-catalyst, in particular a WCx-Ni and a WCx-FeNi catalyst, calcined at 900° C. shows the lowest overpotential.

As indicated previously, the metal catalyst may be used in water splitting process. For this purpose the catalyst material is deposited on a suitable electrode material, such as a Ni electrode. In case of the OER catalyst such an electrode comprising the OER catalyst may function in an electrolyzer for a water splitting process as an anode.

In an embodiment the optimized $WC_x$—FeNi catalyst is deposited on Ni foam. When applying a constant current of 10-50 mAcm$^{-2}$ oxygen gas continuously evolves indicating the thermal durability of these oxygen-evolving catalytic single-atom sites on the $WC_x$ surface.

Hydrogen Evolution Reaction (HER)

It has also been found that in case the present catalyst comprises one of Ru, Ni, RuNi, RuMn, RuV, RuCa, in particular RuNi, as metal catalyst, such a tungsten carbide supported metal catalyst shows improved properties in catalyzing hydrogen evolution reaction (HER) in a water splitting process.

In an embodiment the present HER catalyst shows an overpotential n (10 mA/cm$^2$, alkaline solution) of less than 50 mV, preferably less than 35 mV, more preferably of less than 25 mV, even more preferably of at less than 20 mV.

In a most preferred embodiment the HER catalyst is one of the following: WCx—$Ru_2$, WCx—$Ru_2Ni$, WCx—$Ru_2Ni_2$, WCx—$Ru_2Ni_3$, WCx—$Ru_2Mn_2$, WCx—$Ru_2V_2$, WCx—$Ru_2Ca_2$ with overpotentials n (10 mA/$cm^2$, alkaline solution) in a range between 10 and 22 mV. In contrast, the overpotential of a conventional Pt/C catalyst is about 28 mV.

As in case of the OER catalyst, the calcination temperature has also an influence on the catalytic activity of the catalyst. The best results, i.e. lowest overpotential for HER, is found for a metal-tungsten carbide-catalyst, in particular a WCx—Ru and a WCx—RuNi catalyst, calcined at 800° C.

In yet a further embodiment of the present HER-catalyst the amount of metal catalyst may vary. For example, the metal amount, such as Ru, may be between 0.25 at % and 1 at %, more preferably between 0.25 at % and 0.5 at %, such as 0.49 at %.

The HER-catalyst may be deposited on a suitable electrode material, such as a Ni electrode. In case of the HER catalyst such an electrode comprising the HER catalyst may function in an electrolyzer for a water splitting process as a cathode.

Method of Preparing the Metal-Tungsten-Carbide Catalyst

As indicated above, the method of preparing the metal-tungsten-carbide catalyst according to the proposed solution comprises the steps of:

providing an aqueous solution of at least one aryl compound, adding a solution of at least one metal salt, wherein the metal is selected from the group comprising Fe, Ni, Mn, Co, Cu, Zn, V, Ru, Ir, Ca, Pd, Pt to the aryl compound solution, adding a sodium tungstate solution to the aryl compound-metal solution, whereby a tungstate-metal-aryl compound-precursor is precipitated, collecting the tungstate-metal-dopamine-precursor, and calcinating the tungstate-metal-aryl compound-precursor at a temperature between 70° and 1100° C., preferably between 80° and 1000° C., more preferably between 80° and 900° C., to obtain the metal-tungsten-carbide catalyst.

In a preferred embodiment the at least one aryl compound has chelating properties, as aryl compounds comprising at least one —OH and/or —$NH_2$ moieties. Such aryl compounds may be one of dopamine, aniline, m-Phenylendiamin, p-Phenylendiamin. Dopamine is in particular suitable precursor. The two —OH groups on the C6 aryl ring can strongly bind with almost all metal ions, whereas the additional amine group reacts with the tungstate. It is thought that the aryl compound, such as dopamine, reconstructs during the calcination process to form carbon frameworks and also provide carbon source for tungsten carbide.

The concentration of the at least one aryl compound in the aqueous solution may be in a range between 0.05 and 0.2 M, preferably between 0.08 M and 0.15 M, more preferably 0.1 M. The pH value of said solution may be in a range between 1 and 6, preferably between 1 and 4, more preferably between 2 and 3.

When using dopamine as aryl compound, the method of preparing the metal-tungsten-carbide catalyst according to the solution comprises the steps of:

providing an aqueous solution of dopamine, adjusting the pH value of the dopamine solution to 1-4, preferably 2-3;

adding a solution of at least one metal salt, wherein the metal is selected from the group comprising Fe, Ni, Mn, Co, Cu, Zn, V, Ru, Ir, Ca, Pd, Pt to the dopamine solution, adding a sodium tungstate solution to the dopamine-metal solution, whereby a tungstate metal-dopamine-precursor is precipitated, collecting the tungstate-metal-dopamine-precursor, and calcinating the tungstate-metal-dopamine-precursor at a temperature between 700 and 1100° C., preferably between 80° and 1000° C., more preferably between 80° and 900° C., to obtain the metal-tungsten-carbide catalyst.

In an embodiment of the present process the metal salt solution comprises one or two of the metal salts. In case two different metal salts are used the feeding amounts of the metal salts are adjusted to obtain different amounts and ratios of the two metals in the tungstate-metal-dopamine-precursor.

In an embodiment of the present method the total concentration of metal salt in the metal salt solution is in a range between 0.5 mmol and 1.5 mmol.

In case only one metal salt is used the concentration of the metal salt in the solution may be about 0.5 mmol. In case two different metal salts are used the concentration of each of the two metal salt may be between 0.25 mmol and 1.0 mmol, for example is 0.25 mmol, 0.5 mmol or 1.0 mmol.

BRIEF DESCRIPTION OF THE DRAWINGS

The solution is explained in the following in more detail by means of the examples with reference to the Figures.

FIG. 1*a* shows a schematic illustration of the synthetic procedures: a, formation of the metal-organic complex; b, further reaction, and growth of microspherical tungsten-based precursor; c, carbonization process.

FIGS. 1*b-c* shows DFT module of a WCx-FeNi structure.

FIGS. 2*a-g* show Morphology and structure of the materials: (a) Schematic illustration of $WC_x$—FeNi catalyst, consisting of Fe and Ni atoms stabilized on $WC_x$ nanocrystallites (majority component) surrounded by carbon sheets. (b) HAADF-STEM image of a $WC_x$ nanocrystallite. (c and d) HAADF-STEM images of the atom arrays on the $WC_x$ and surface loaded single atoms. A schematic atomic structure and a simulation HAADF-STEM image is superposed on the image. (e) The corresponding intensity profiles along (121) plane over the dimmer atomic columns (marked by the arrows 1-5). (f) Atomically resolved STEM spectrum imaging the edge of the nanocrystallite to show the distribution of W, Fe, Ni elements. (g) EDX spectra of a single-pixel at different positions (1-6).

DETAILED DESCRIPTION

A) Oxygen Evolution Reaction (OER)

Figure 1D:
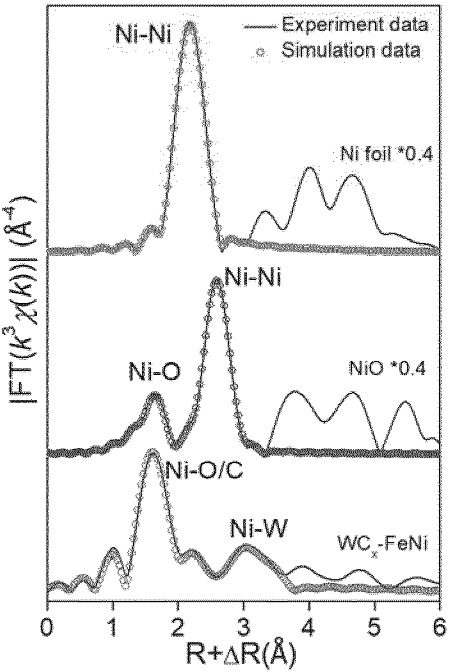
FIG. 1*d* shows $k^3$-weighted FT spectra from the XAFS analysis.
Figure 1D:
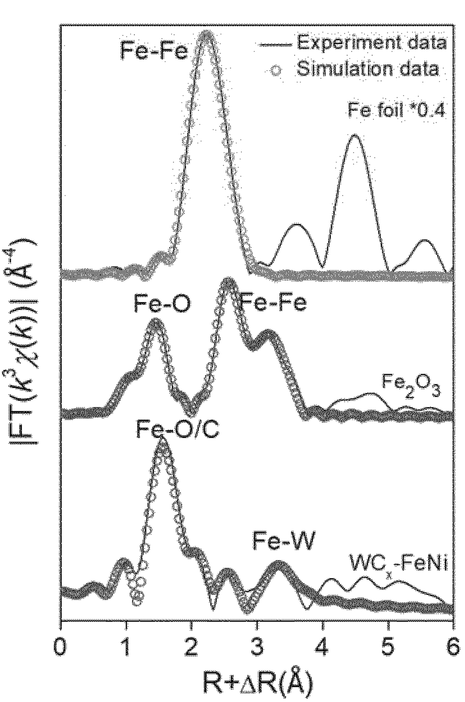

Synthesis of $WC_x$—FeNi, $WC_x$—Ni, $WC_x$—Fe, and $WC_x$ catalysts:

First, 5 mmol (0.948 g) dopamine hydrochloride (DA) was dissolved in 50 mL water, resulting in a 0.1 M dopamine in water solution. The pH value of the dopamine solution was adjusted to ~2 by adding 2 mL of 1 M HCl. After that, 0.25 mmol $FeCl_3 \cdot 6H_2O$ and 0.25 mmol $NiCl_2 \cdot 6H_2O$ were added together into the DA solution and well mixed by stirring. Following, 50 mL sodium tungstate solution (containing 5 mmol $Na_2WO_4 \cdot 2H_2O$) was dropped slowly (about 10 min) into the DA-FeNi solution. The reaction happens immediately, then the precipitation starts, and the color of the suspension changes from dark brown to bright yellow during the addition of sodium tungstate. Finally, a greenish-yellow precipitate formed. The reaction was further stirred for 1 h, and then the product was collected by centrifugation and washed with DI water and ethanol for 3 times. The products were dried in an oven at 60° C. overnight to obtain the DA-W—FeNi precursor.

Then the DA-W—FeNi precursor was carbonized in an Argon furnace at different temperatures (800, 900, and 1000° C.) for 2 h, with a ramp of 2° C./min. The final black powder was designated as $WC_x$—FeNi-800, $WC_x$—FeNi (indicating the materials carbonized at 900° C., unless specified), $WC_x$—FeNi-1000, and collected in a glass bottle for further use. To further confirm the influence of the temperature on the OER performance and crystals structures of the synthesized catalysts, the DA-W—Ni precursor was also thermally treated at different temperatures (700, 800, 900, and 1000° C.) for 2 h.

In order to get different contents and different ratios of Fe/Ni in the final $WC_x$—FeNi catalysts, the feeding amounts of Fe and Ni source in the DA-W—FeNi precursor were adjusted. All the synthesized catalysts with different FeNi amounts synthesized so far are summarized in Table 1. Furthermore, for comparison, the same synthetic approach as for $WC_x$—FeNi has been carried out to synthesize $WC_x$.

TABLE 1

The feeding amount of Fe and Ni source of all the synthesized catalysts with different compounds.

| Samples | $WC_x$ | $WC_x$-$Fe_{0.5}Ni_0$ | $WC_x$-$Fe_{0.5}Ni_{0.25}$ | $WC_x$-$Fe_{0.25}Ni_{0.5}$ | $WC_x$-$Fe_{0.5}Ni_{0.5}$ | $WC_x$-$Fe_{0.5}Ni_1$ | $WC_x$-$Fe_1Ni_{0.5}$ | $WC_x$-$Fe_0Ni_{0.5}$ |
|---|---|---|---|---|---|---|---|---|
| Fe | 0 | 0.50 mmol | 0.50 mmol | 0.25 mmol | 0.50 mmol | 0.50 mmol | 1.00 mmol | 0 |
| Ni | 0 | 0 | 0.25 mmol | 0.50 mmol | 0.50 mmol | 1.00 mmol | 0.50 mmol | 0.50 mmol |

The synthetic process is schematically illustrated in FIG. 1*a*. Dopamine molecules firstly coordinate with Fe and Ni ions, which then assemble with tungstate ions to form metal-organic compounds as yellow-green powders. SEM micrograph reveal a microspherical morphology, formed by aggregated nanosheets or flakes. Thermogravimetric analysis (TGA) under $N_2$ flow shows that weight loss occurs at around 400° C. and 800° C., while from 900° C. no further weight loss can be observed. Furthermore, the powder X-Ray diffraction (XRD) depicts nearly no structural changes from 900° C. to 1000° C.

FIG. 1*b-c* illustrates the structure module of the $WC_x$ supported FeNi single atoms. FIG. 1*d* shows detailed structural information in the $k^3$-weighted FT spectra in R-space at the Ni K-edge (left) and the Fe K-edge (right) from the XAFS analysis.

Figure 2D:
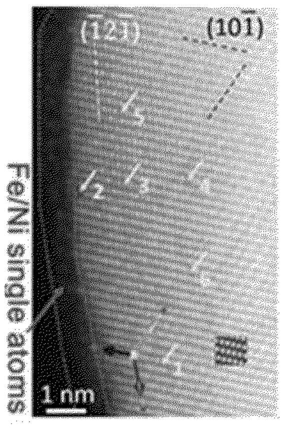
Figure 2E:
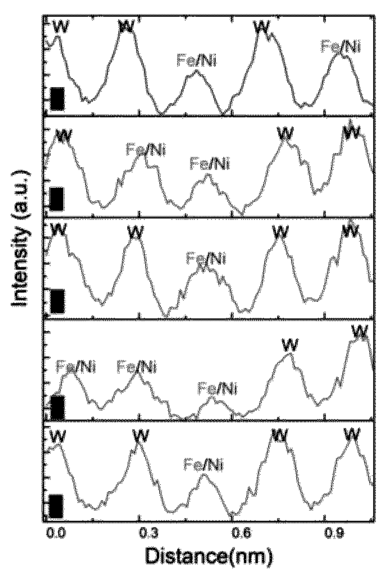
Figure 2F:
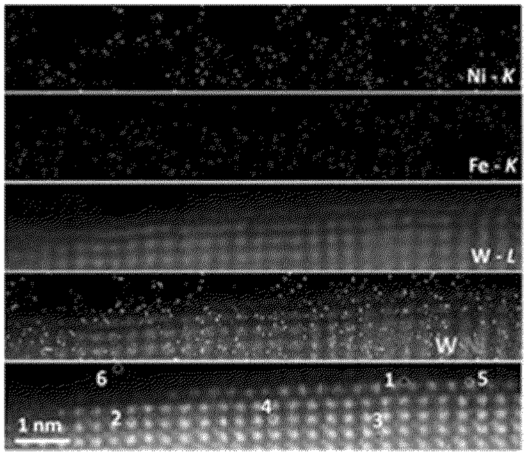
Figure 2G:
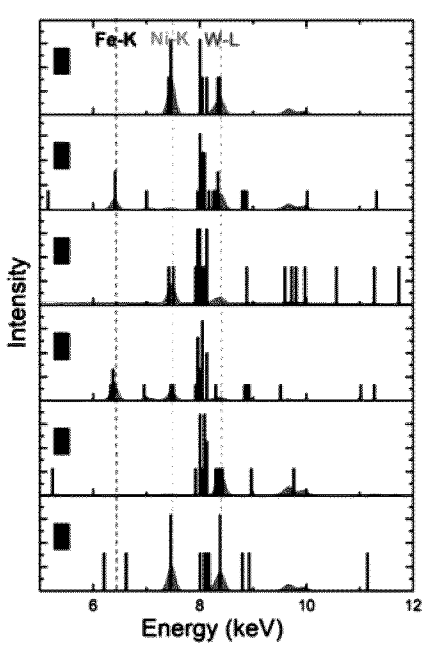
Figure 3A:
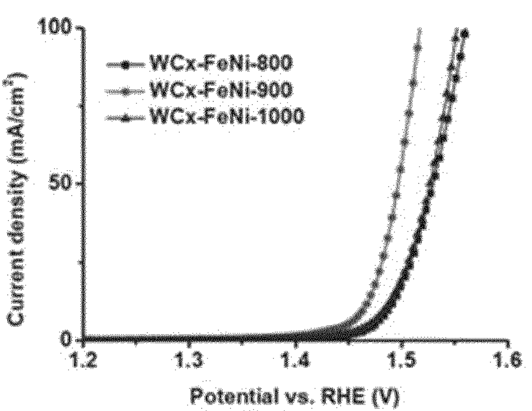
FIG. 3 shows OER performances of $WC_x$—FeNi catalysts obtained under different temperatures. The results indicate the lowest overpotential of $WC_x$—FeNi obtained at 900° C.
Figure 3B:
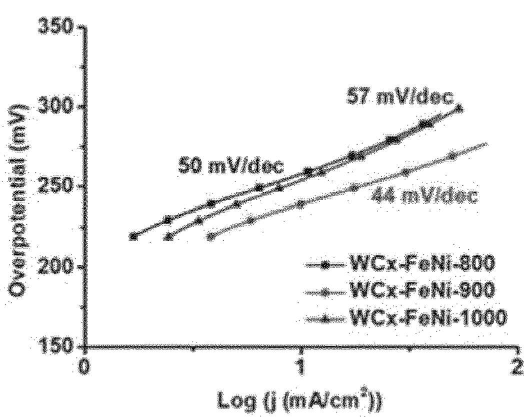
Figure 3C:
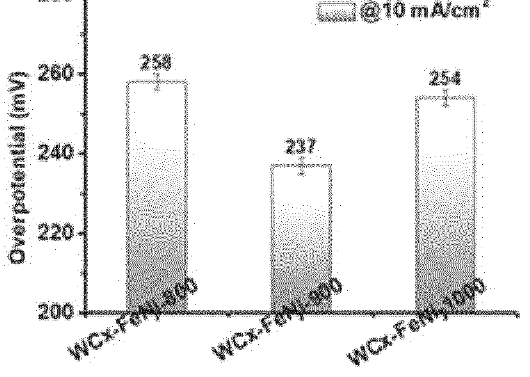
Figure 3D:
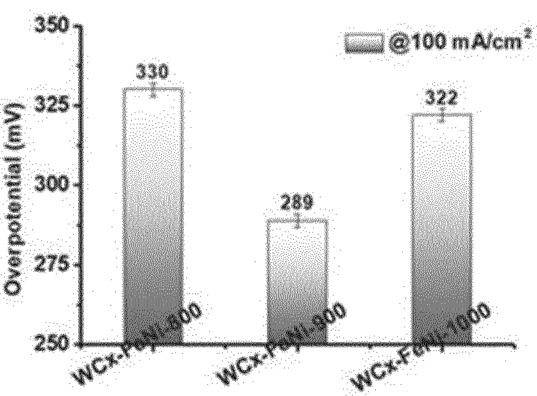

FIG. 2*a* illustrates the structure of the catalysts as concluded from the conducted measurements (vide infra). First, the SEM images show that all carbonized materials maintain the microspherical morphology of the precursor. High-angle annular dark-field scanning transmission electron microscopy (HAADF-STEM) images depict that the $WC_x$ catalysts consist of $WC_x$ nanocrystallites surrounded by carbon sheets. As single-atom doped carbon show insufficient catalytic activity and durability for the OER, the interest regarding possible active sites for OER was mainly focused on the well-crystallized $WC_x$ nanocrystallites (FIG. 2*b*). The atomic-resolution STEM images of $WC_x$ nanocrystallites observed along [110] and [111] crystallographic directions (FIGS. 2*c*, 2*d*) shows a bright W atom array with some dark atomic columns, which can be distinguished as Fe/Ni atoms on the surface. The line-profiles for the HAADF image (FIG. 2*e*) are taken across a dimmer atomic column along the ($\bar{1}2\bar{1}$) plane (FIG. 2*d* right, arrow 1 to 5), which demonstrates the significant variation in atomic column intensity, proving the presence of Fe/Ni atoms with a random distribution on or near the surface of $WC_x$.

The electrocatalytic OER activities of $WC_x$—Ni and $WC_x$—FeNi prepared at different temperatures was compared by linear sweep voltammetry (LSV) scan using a rotating disk electrode (RDE) at a scan rate of 10 mV $s^{-1}$ with simultaneous iR correction (FIG. 3) confirming that the sample calcined at 900° C. shows the lowest overpotential.

Figure 4A:
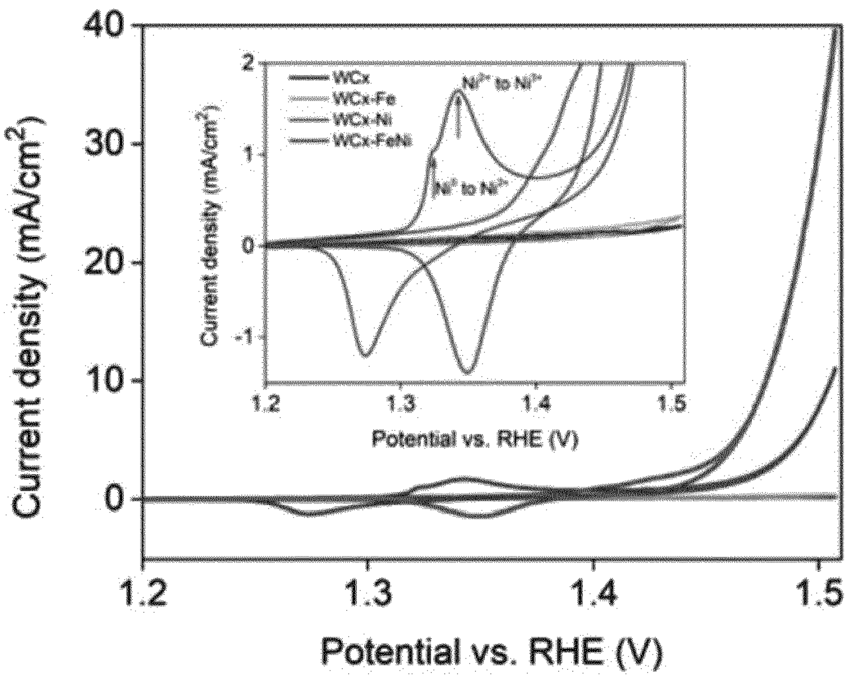
FIGS. 4*a-f* show performances of $WC_x$—FeNi catalysts and control samples in a three-electrode configuration in 1 M KOH at room temperature: (a and b) The CV and OER polarization curves of different catalysts with real-time iR correction (4.4 ohms). (c) The OER data analysis of overpotentials (obtained from OER polarization curves at the current density of 10 mA $cm^{-2}$) and Tafel slopes. (d) TOFs of the measured catalysts calculated based on the loaded Fe, Ni, and FeNi atoms at different overpotentials. (e) Mass activities of the catalysts based on Fe, Ni, and FeNi atoms. (f) Overpotentials of $WC_x$—FeNi with different FeNi ratios (Fixed Ni (or Fe) at 0.5 at. % and change Fe (or Ni) amount), and the corresponding activity trend. Error bars represent the average values (mean±SD, n=5).

Cycle voltammetry (CV) displayed in FIG. 4*a* shows the $Ni^0$ to $Ni^{2+}$, and $Ni^{2+}$ to $Ni^{3+/4+}$ redox features of $WC_x$—Ni, confirming the presence of $Ni^0$ single atoms in the catalyst. The addition of Fe changes the redox features of Ni, as the oxidation potential shifts to a higher voltage (from around 1.34 V vs. RHE to 1.41 V vs. RHE) in $WC_x$—FeNi, indicating the synergetic effects between Fe and Ni atoms in electrochemical conditions. At the reduction cycle, the reduction peak is as well observed at higher potentials in $WC_x$—FeNi than in $WC_x$—Ni.

Figure 4B:
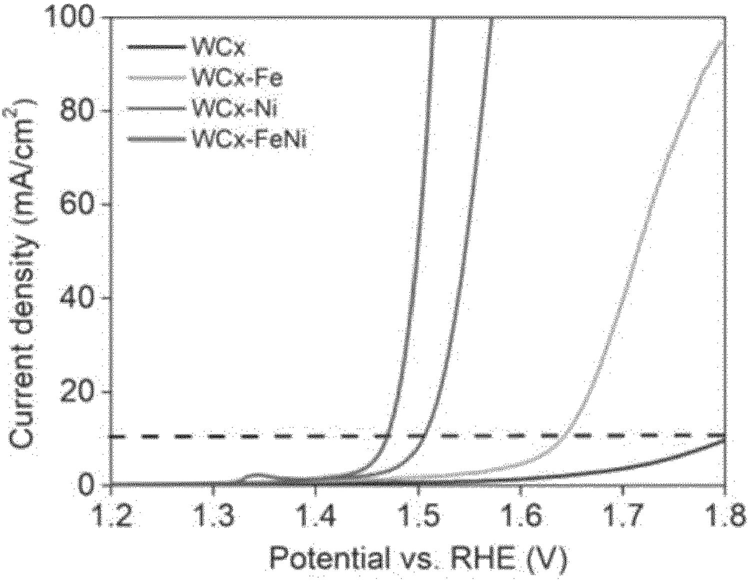
Figure 4C:
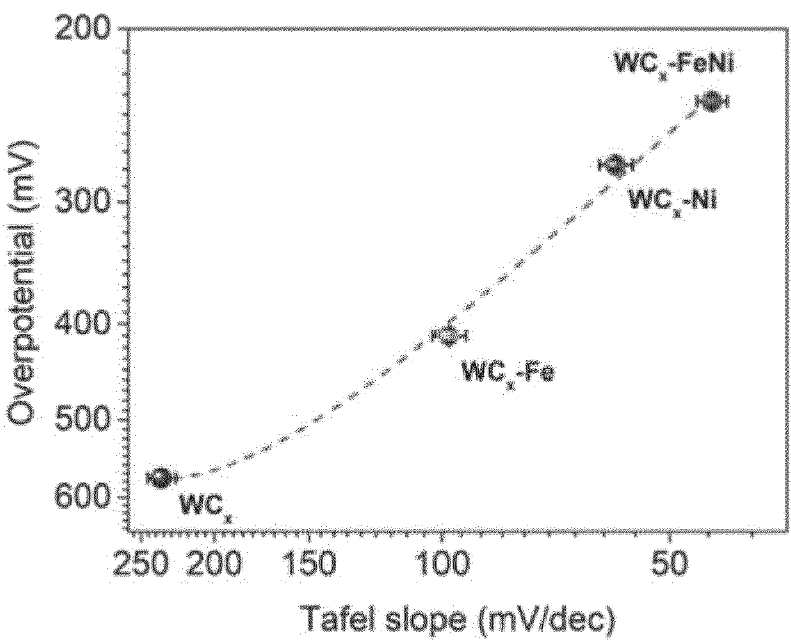
Figure 5A:
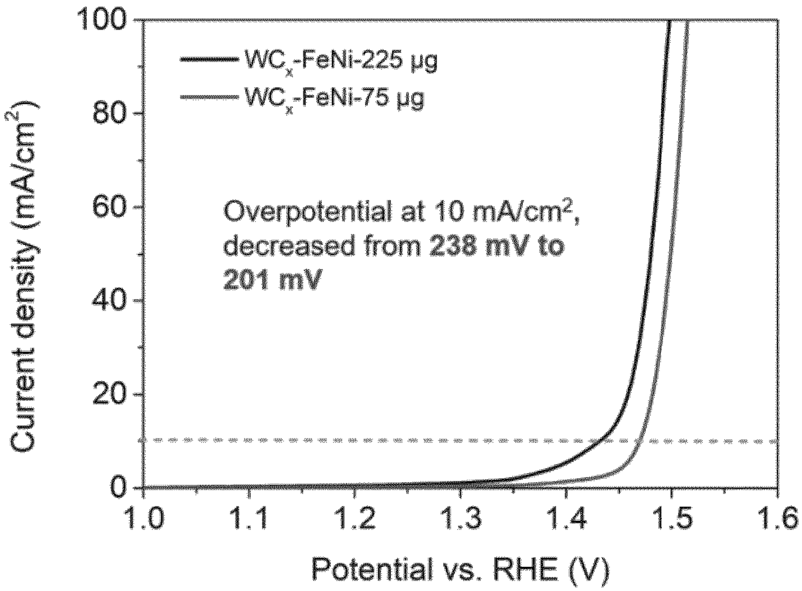
FIG. 5 shows OER performances of $WC_x$—FeNi with different catalysts loading amounts: a) activity based on the geometric area of the electrode; b) activity based on the loading mass of the catalysts. The required overpotential to reach 10 mA $cm^{-2}$ can be further decreased from 237 mV to 201 mV when the loading amount of $WC_x$—FeNi on the glassy carbon electrode increased from 0.38 $mg/cm^{-2}$ (contains ~3.12 wt. % of Fe (1.39 wt. %) and Ni (1.73 wt. %) in total, indicates a loading of Fe and Ni is 11.85 $g/cm^{-2}$) to 1.14 $mg/cm^2$ (Fe and Ni: 35.57 $\mu g/cm^{-2}$), the required overpotential to reach 10 mA $cm^{-2}$ is decreased from 237 mV to 201 mV.
Figure 5B:
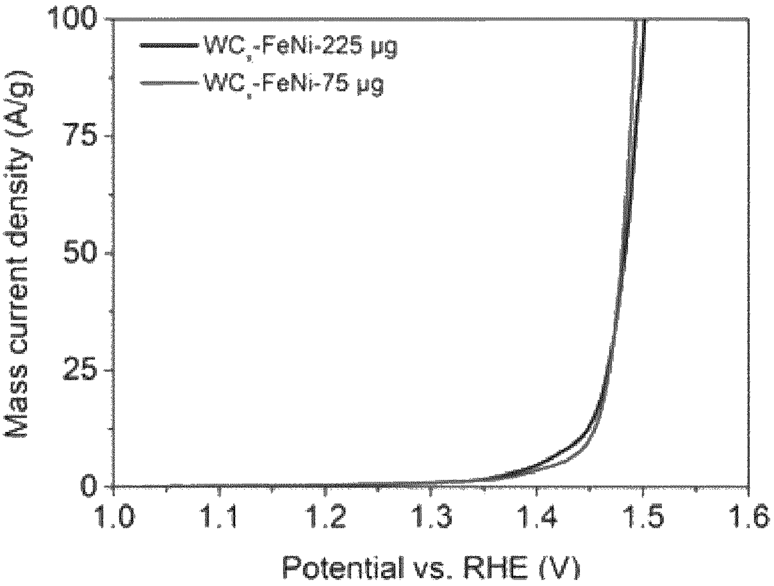
Figure 6:
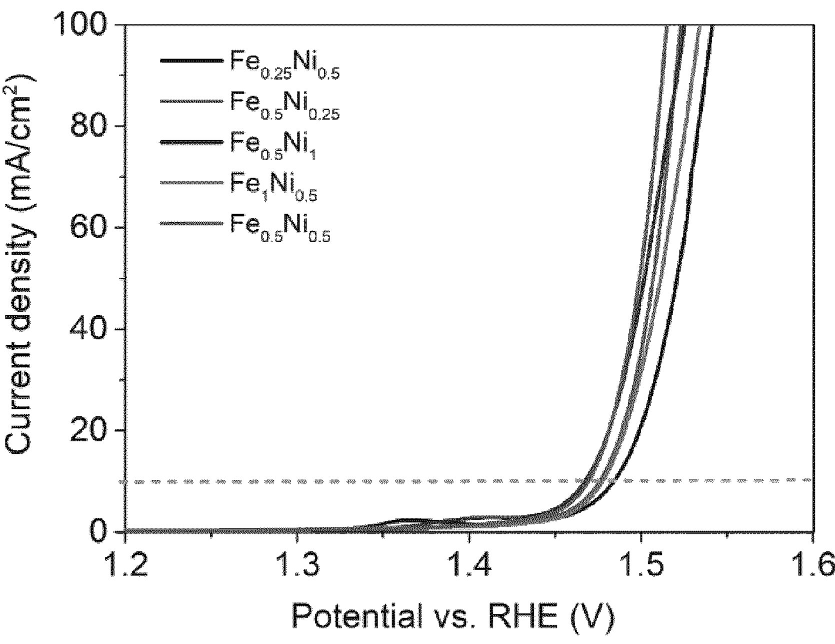
FIG. 6 shows OER performances of $WC_x$—FeNi with different Fe and Ni ratios in the catalysts.

The OER polarization curves are compared in FIG. 4*b*, showing that $WC_x$—Ni requires an overpotential of 275 mV at 10 mA $cm^2$ (see also Table 2), which is 136 mV lower than that of $WC_x$—Fe. However, when Fe and Ni are introduced simultaneously, the $WC_x$—FeNi requires an overpotential of only 237 mV at 10 mA $cm^{-2}$, which is much lower than for $WC_x$—Fe, $WC_x$—Ni, and bare $WC_x$, demonstrating that the high OER activity results from a synergistic effect of Fe and Ni sites. The Tafel slope to overpotential (FIG. 4*c*) and electrochemical impedance (not shown) give consistent results, in particular, the $WC_x$—FeNi requires the lowest overpotential (237 mV) and Tafel slope (44 mV/dec) and shows the highest mass and electron transfer speeds. Besides, the required overpotential to reach 10 mA $cm^{-2}$ can be further decreased from 237 mV to 201 mV, when the loading amount of $WC_x$—FeNi increases from 0.38 $mg/cm^{-2}$ to 1.14 $mg/cm^2$ (FIG. 5).

Figure 4D:
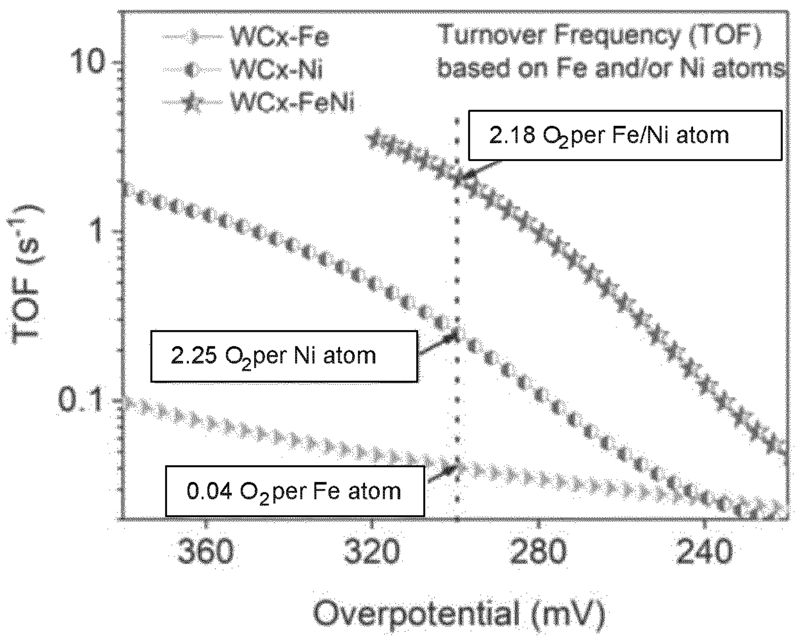
Figure 4E:
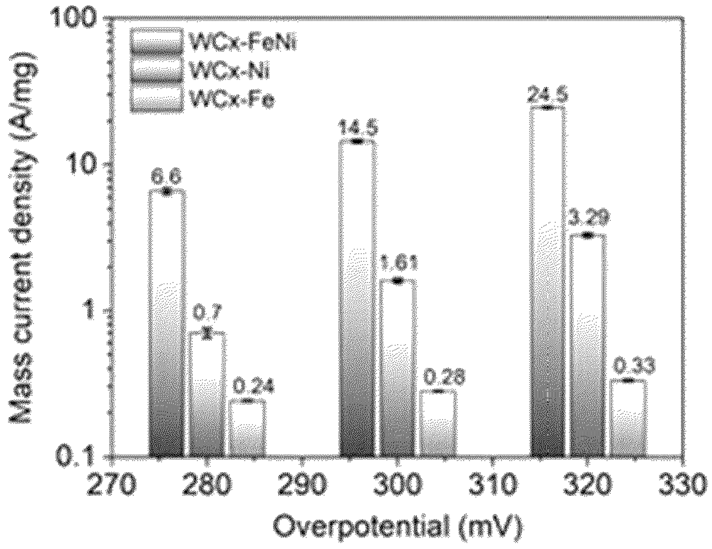

To investigate the intrinsic oxygen-evolving catalytic activity of $WC_x$-supported single atoms, the turnover frequencies (TOFs) (FIG. 4*d*) and mass activities (FIG. 4*e*) are calculated. The $WC_x$—FeNi exhibits an extremely high TOFs value of 2.18 $s^{-1}$ per ½ FeNi atoms and mass activities of 14.5 A $mg^{-1}$ at the overpotential of 300 mV. When increasing the applied overpotential to 320 mV, the value of TOFs and mass activity increased to 3.63 $s^{-1}$ and 24.5 A $mg^{-1}$, which are more than 5 times of the values for $WC_x$—Ni and even 70 times higher than for $WC_x$—Fe. $WC_x$—FeNi also compares well to other state-of-the-art non-noble metal-based OER catalysts based on recent reports (Table 2).

TABLE 2

Comparison of catalytic parameters of $WC_x$ supported single-atom catalysts and literature reported catalysts. All current densities are based on geometric area.

| Samples | Overpotential at 10 $mA/cm^2$ (mV) | Tafel slop (mV/dec) | TOF at overpotential of 300 mV ($s^{-1}$) | Catalysts loading ($mg/cm^2$) | Ref. no |
|---|---|---|---|---|---|
| WCx | 573 | 235 | — | 0.38 | This work |
| WCx-Fe | 411 | 98 | 0.04 | 0.38 | This work |
| WCx-Ni | 275 | 59 | 0.36 | 0.38 | This work |
| WCx-FeNi | 237 | 44 | 2.18 | 0.38 | This work |
| WCx-FeNi | 201 | 56 | 1.10 | 1.14 | This work |
| G-FeCoW | 223 | | 0.46 | 0.21 | Zhang, B. et al., Science 352, 333-337, (2016) |
| A-FeCoW | 301 | | 0.17 | 0.21 | Zhang, B. et al., Science 352, 333-337, (2016) |
| LDH FeNi | ~300 | ~38 | 0.05 | 0.07 | Song, F. & Hu, X., Nature Comm. 5, 4477, (2014) |
| LDH NiCo | ~330 | ~40 | 0.01 | 0.07 | Song, F. & Hu, X., Nature Comm 5, 4477, (2014) |
| $IrO_2$ | 260 | | 0.01 | 0.21 | Song, F. & Hu, X. Nature Comm 5, 4477, (2014) |
| $Ni-N_4-C_4$ | 331 | 63 | 0.72 | 0.28 | Fei, H. et al. Nature Catalysis 1, 63-72, (2018) |
| $W-Ni(OH)_2$ | 237 | 33 | 0.74 | 0.20 | Yan, J. Q. et al., Nature Comm 10, (2019) |
| NiCo-UMOFNs | 250 | 42 | 0.86 | 0.20 | Zhao, S. et al. Nat Energy 1, 16184, (2016) |

Figure 4F:
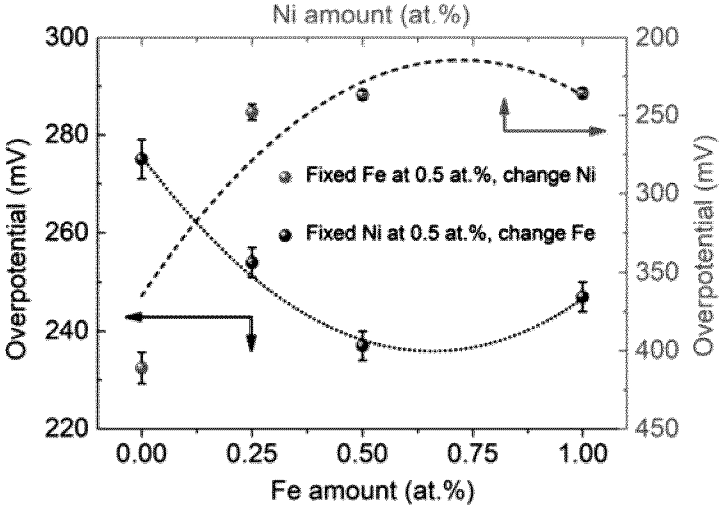

To reveal the kinetic activities of Fe and Ni, the feeding amount of Fe atoms were kept at 0.5 at. % and changed the Ni ratio from 0 to 1.0 at. % in relation to W (FIG. 4*f*, FIG. 5). The overpotential at 10 $mA/cm^2$ decreases dramatically from 411 mV ($WC_x$—$Fe_{0.5}Ni_0$) to 248 mV ($WC_x$—$Fe_{0.5}Ni_{0.25}$). With a further increase of Ni in the system, the lowest overpotential reaches 237 mV ($WC_x$—$Fe_{0.5}Ni_{0.5}$) and 236 mV ($WC_x$—$Fe_{0.5}Ni_1$). If the Ni amount is fixed to 0.5 at. %, the overpotential decreases along with increased Fe ratio and reaches to the lowest overpotential of 237 mV at 0.5 at. % Fe ratio ($WC_x$—$Fe_{0.5}Ni_{0.5}$), which then increases to 247 mV, when further increasing the Fe amount to 1.0 at. % ($WC_x$—$Fe_1Ni_{0.5}$). This activity trend study allows us to optimize the catalytic performance of $WC_x$—FeNi catalysts. Considering the better kinetics of $WC_x$—$Fe_{0.5}Ni_{0.5}$ than $WC_x$—$Fe_{0.5}Ni_1$, the following studies on durability, structure, and theoretical calculation will mainly focus on the $WC_x$—$Fe_{0.5}Ni_{0.5}$ catalyst.

The operating durability is essential to assess the device application potential of OER catalysts, thus water oxidation tests were performed utilizing the optimized $WC_x$—FeNi catalyst deposited on Ni foam under constant current of 10 mA $cm^2$, 20 mA $cm^2$, 50 mA $cm^{-2}$, and 10 mA $cm^{-2}$ continuously for 130 hours. No appreciable increase in overpotential was observed in this time interval (not shown). To gain insight into the thermal durability of $WC_x$—FeNi, the material was subjected to a post thermal treatment in air (200° C.) or under Argon (900° C.). However, after these thermal treatments, the overpotentials show hardly any change at 10 mA $cm^2$, indicating the thermal durability of these oxygen-evolving catalytic single-atom sites on the $WC_x$ surface.

To gain insight into the electronic structure of $WC_x$—FeNi, X-ray photoelectron spectroscopy (XPS) was applied, revealing the surface oxidation state. The high-resolution W 4f spectra show a decreased intensity of surface oxygenation peaks for $WC_x$—Ni, $WC_x$—Fe, and $WC_x$—FeNi, when compared to pure $WC_x$ (not shown). The O content at the surface of pure $WC_x$ is 10.48 at. %, while it decreases to 4.93 at. % for $WC_x$—Ni, 8.76 at. % for $WC_x$—Fe, and 7.97 at. % for $WC_x$—FeNi. This variation can be attributed to the different oxidation properties of Fe and Ni species. Ni 2p peaks of $WC_x$—Ni show a distribution of both ionic $Ni^{2+}$ (in the state of Ni—OH, and Ni—O) and metallic $Ni^0$, with a calculated $Ni^{2+}$:$Ni^0$ peak area ratio of 0.8. After adding Fe, the $Ni^{2+}$:$Ni^0$ peak area ratio increases to 2.9, thus the presence of Fe yields a higher amount of oxidized Ni-species. The Fe 2p spectra of $WC_x$—Fe and $WC_x$—FeNi both show a mixture of $Fe^0$, $Fe^{2+}$, and $Fe^{3+}$ valences.

X-ray absorption near-edge structure (XANES) spectra show a reduction of the white-line intensity (gray arrow) at the W $L_3$ edge compared with commercial WC powder, thus corroborating the lower valence state of W in $WC_x$—FeNi, which can be explained by the formation of a $W_2C$ and WC mixture. Fourier transforms (FTs) of the extended X-ray absorption fine structure (EXAFS) spectra of W reveal a similar WC structure with the commercial WC powder, however with lower W—W and W—C coordination numbers ($^aN$), which confirms the high amount of surface defects and C atom vacancy on $WC_x$.

XANES of $WC_x$—FeNi at the Ni K-edge reveals an average valence between $Ni^0$ and $Ni^{2+}$, and the Fe K-edge reveals an average valence between $Fe^{2+}$ and $Fe^{3+}$. The FTs and wavelet-transform images from the EXAFS spectra in $WC_x$—FeNi depict that the Fe coordination and valence environment are contributed partly by the $Fe^0$ in Fe—W, and $Fe^{2+/3+}$ ions in Fe—O/C, while Ni is contributed partly by $Ni^0$ in Ni—W, and $Ni^{2+}$ in Ni—O/C. The EXAFS fitting parameters at the Ni and Fe K-edge of $WC_x$—FeNi show that the bond distances of Ni—W (3.43 and 3.60 Å) and Fe—W (3.52 Å) are much longer than the W—W bond (2.88 Å). Combined with the high mobility of Ni and Fe atoms under the electron beam, it is suggested that the atomically dispersed FeNi metal sites are weakly bond on the surface of the $WC_x$ nanocrystallite instead of inserted in the crystal or replacing W/C atoms.

B) Hydrogen Evolution Reaction (HER)

Synthesis of HER catalysts $WC_x$-Rui, $WC_x$—RuNi catalysts was conducted in analogy to the OER catalysts as described above.

Figure 7:
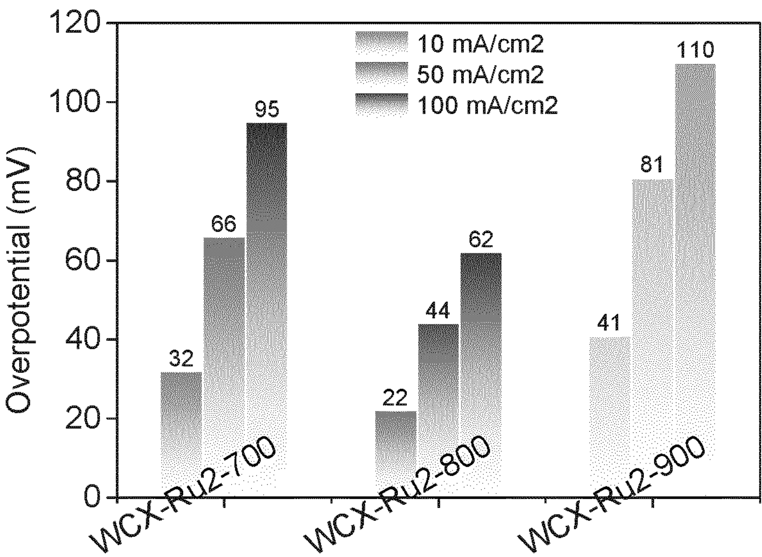
FIG. 7 shows HER activity in 1 M KOH of WCx-$Ru_2$ obtained at different temperatures.

FIG. 7 illustrates the HER activity of WCx—Ru2 in 1M KOH obtained at different temperatures, whereby the best performance obtained at 800° C. The atomic content of Ru in the $WC_x$—Ru2 catalyst is 0.49 at. %, which is weight percentage of 2.28 wt. %

Figure 8:
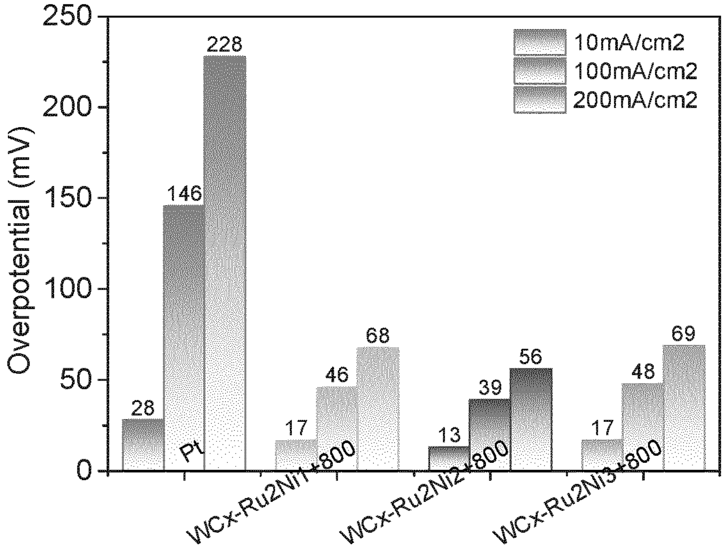
FIG. 8 shows Investigation of Ni atom effects on the performance of Ru catalysts.

Noble metals, such as Pt, Ru, and Pd, have considered to be ideal HER electrocatalysts. However, their activity in alkaline condition is much lower than that in acidic condition. To improve the activity of Ru catalyst for HER in alkaline condition, WC was used as a support, Ni atoms are investigated as mediator to adjust the H* adsorption, and the OH— desorption steps, therefore enhance the HER activity (FIG. 8).

Figure 9:
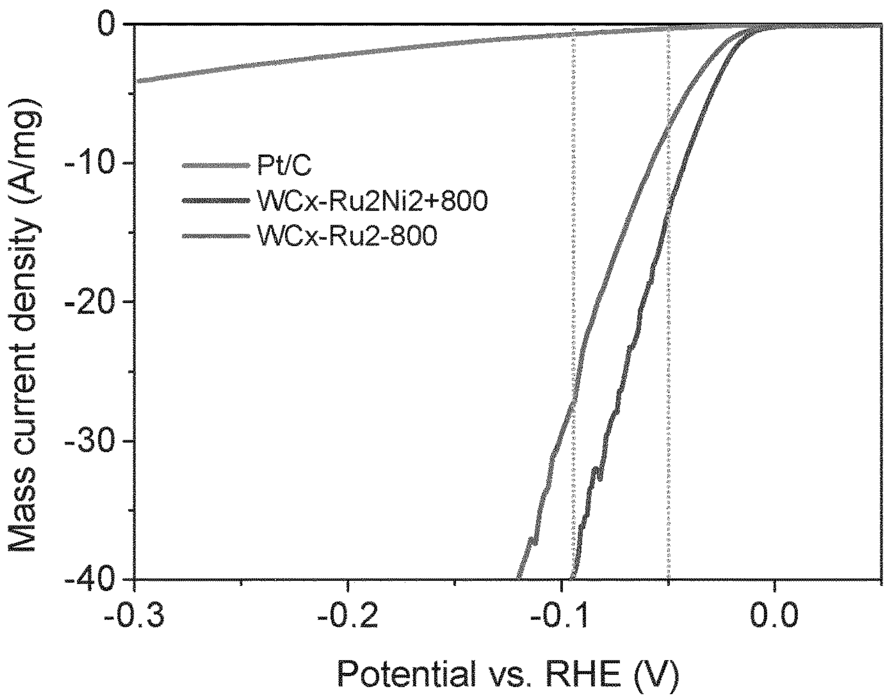
FIG. 9 shows Activity and Mass activity compare with the Pt/C and WCx-Ru.

As illustrated in FIG. 9 the mass activity of $WC_x$—Ru catalyst is more than 50 times higher than Pt/C at the overpotential at 100 mV and the mass activity of $WC_x$-Ru2Ni2-800 catalyst is more than 50 times higher than Pt/C at the overpotential at 95 mV.

Figure 10:
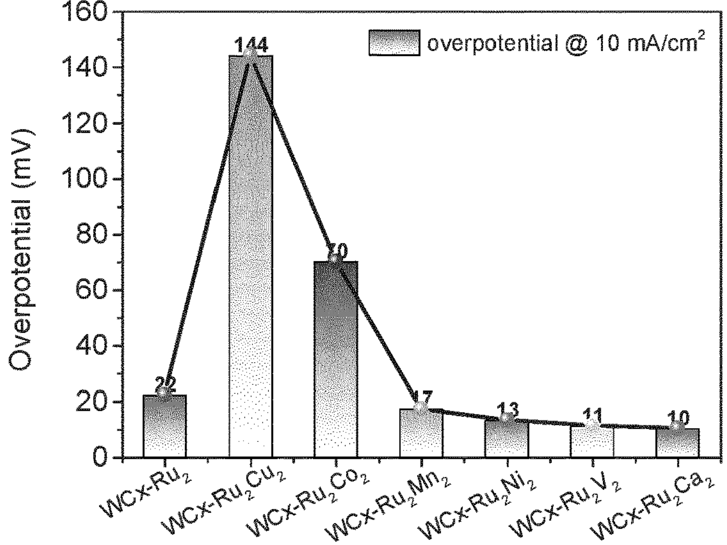
FIG. 10 shows WC-RuX bi-atomic system for $H_2$ evolution reaction (X═Cu, Co, Mn, Ni, V, Ca).

Besides Ni further metals such as Cu, Co, Mn, Ni, V, Ca were tested in a WC—RuX bi-atomic system for $H_2$ evolution reaction. In particular WC—Ru system comprising Mn, V, Ca showed good results (see FIG. 10).

Chemical Reagents and Materials $Na_2WO_4 \cdot 2H_2O$, dopamine hydrochloride, HCl, $FeCl_3 \cdot 6H_2O$, $NiCl_2 \cdot 6H_2O$, and KOH were obtained from Alfa Aesar. Nafion 117 solution was obtained from sigma aldrich. Unless otherwise stated, all the reagents were of analytical grade and were used as received. All aqueous solutions were prepared with DI water produced from Millipore purification system.

Characterizations and Methods

Scanning Electron Microscopy (SEM)

The morphology of the prepared precursors and final materials were observed by high-resolution FE-SEM (Hitachi S-4000 and S-4800). All the carbonized materials were observed directly without gold coating. For the non-conductive precursors, the gold was deposited with a layer of about 1 nm.

Scanning Transmission Electron Microscopy (STEM)

For STEM characterization, the NPs were drop-casted on Lacey carbon-coated Cu grids. STEM investigations were performed using a JEOL JEM-ARM 200F scanning transmission electron microscope equipped with a cold field emission electron source, a DCOR probe corrector (CEOS GmbH), a 100 $mm^2$ JEOL Centurio EDX detector, and a Gatan GIF Quantum ERS electron energy-loss spectrometer. The microscope was operated at 200 kV, a semi-convergence angle of 20.4 mrad, resulting in a probe size of 0.8 Å (1 Å for the EELS and EDXS analyses). 83-205 mrad collection angles were used to obtain the HAADF images. A collection semi-angle of 83 mrad was used for EELS measurements. The pixel dwell time for the spectrum imaging was set to 0.01 seconds; EDX and EELS signals were recorded simultaneously. The HAADF-STEM image simulations were performed using the QSTEM image simulation software [C. T. Koch, *ProQuest Dissertations and Theses, Arizona State University* 2002].

X-Ray Photoelectron Spectra (XPS)

XPS was measured on K-Alpha™+X-ray Photoelectron Spectrometer System (Thermo Scientific) with Hemispheric 180° dual-focus analyzer with 128-channel detector. X-ray monochromator is Micro focused Al-Kα radiation. For the measurement, the prepared powder samples were pressed and loaded on carbon taps, then pasted onto the sample holder for measurement. The data was collected with X-ray spot size of 400 μm, 20 scans for the survey, and 50 scans for the specific regions.

X-Ray Diffraction (XRD)

Powder XRD of all the prepared samples were measured with the same condition on a Bruker D8 Advance instrument with Cu Kα radiation (λ=1.54 Å) at a generator voltage of 40 kV and a generator current of 50 mA.

Thermogravimetric Analysis (TGA)

TGA was conducted in $N_2$ conditions from room temperature to 1000° C., with a rapid of 10° C./min.

X-Ray Absorption Spectra (XAS) The Tungsten Lm-edges XAFS spectra of the standards and samples were collected at the beamline BL1W1B of the Beijing Synchrotron Radiation Facility (BSRF). The typical energy of the storage ring was 1.5 GeV, and the electron current was 180 mA in the top-up mode. The white light was monochromatized by a Si (111) double-crystal monochromator and calibrated with a W foil ($L_{III}$ edge 10207 eV). Samples were pressed into thin slices and positioned at 90° to the incident beam in the sample-holder. The XAFS spectra were recorded in transmission mode with two ion chambers.

The XAFS data were analyzed using the software packages Demeter (Ravel and Newville, 2005, Ravel, B., Newville, M., 2005. ATHENA, ARTEMIS, HEPHAESTUS: data analysis for X-ray absorption spectroscopy using IFEFFIT. Journal of Synchrotron Radiation 12, 537-541). The spectra were normalized using Athena firstly, and then shell fittings were performed with Artemis. The $\chi(k)$ function was Fourier transformed (FT) using $k^3$ weighting, and all fittings were done in R-space. The amplitude reduction factor ($S_0^2$) was estimated to be 0.827 according to the fitting results of the W foil. The coordination parameters of sorption samples were obtained by fitting the experimental peaks with theoretical amplitude.

To further investigate the first-shell backscattering atoms and detect light and heavy scatters, wavelet transform (WT) analysis was employed using the Igor pro script developed by Funke et al. (Funke et al., 2005, Funke, H., Scheinost, A. C., Chukalina, M., 2005. Wavelet analysis of extended X-ray absorption fine structure data. Physical Review B 71). This qualitative analysis was primarily focused on the nature of the backscattering atoms as well as the bond lengths owing to the fine resolution in both wavenumbers k and radial distribution function R, and complemented the limitation of FT analysis. A Morlet wavelet was chosen as basis mother wavelet, and the parameters (η=8, σ=1) were used for a better resolution in the wave vector k.

Electrochemical Measurements

Ink Preparation

The catalyst ink was prepared by blending the catalyst powder (15 mg) with 100 μL Nafion solution (5 wt. %) and 900 μL ethanol in an ultrasonic bath. 5 μL of catalyst ink was then pipetted onto the GC surface, leading to a catalyst loading of 0.38 mg/cm$^2$. The TOFs data was calculated based on the atomic content (from XPS) of the Fe and/or Ni in the catalysts.

Electrodes and Measurements

All the electrochemical measurements were carried out in a conventional three-electrode cell using the Gamry reference 600 workstations (Gamry, USA) at room temperature. A commercial RHE electrode was used as the reference electrode, and the graphite rod was used as counter electrode. The Ag/AgCl reference electrode calibrated with RHE in 1 M KOH was used as reference electrode for long-time stability measurement. A glassy carbon (GC) RDE electrode with an area of 0.196 cm$^2$ served as the substrate for the working electrode to evaluate the OER activities of various catalysts. The electrochemical experiments were conducted in $N_2$ saturated 1 M KOH electrolyte. The CV and OER polarization curves of different catalysts with real-time iR corrected by Gamry reference 600 potentiostats at a resistance of 4.4 ohms. The RDE measurements were conducted at a rotating speed of 1600 rpm with a sweep rate of 10 mV/s.

Electrochemical impedance spectroscopy (EIS) was carried out with a potentiostatic EIS method with a DC voltage of 1.5 vs. RHE, in an $N_2$ saturated 1.0 M KOH electrolyte from 100 kHz to 0.1 Hz with a 10 mV AC potential at 1600 rpm. The stability tests for the catalysts were conducted using chronopotentiometry at the constant working current densities of 10 mA/cm$^2$, 20 mA/cm$^2$, 50 mA/cm$^2$, and 10 mA/cm$^2$.

To investigate the intrinsic oxygen-evolving catalytic activity of $WC_x$ supported single atoms, the turnover frequencies (TOFs) and mass activities are calculated by X-ray photoelectron spectroscopy (XPS) data. To reveal the activity of each Fe and Ni active site, the TOFs of $WC_x$—Fe, $WC_x$—Ni, and $WC_x$—FeNi are calculated based on the amount of Fe, Ni, and ½ FeNi atoms in the materials. It was confirmed that the $WC_x$ support materials contribute very low activity for OER at the overpotential higher than 550 mV, which is meaningless to discuss its performance.

The invention claimed is:

1. A method of preparing a single-atom catalyst for use in a water splitting process comprising; at least one support material; and at least one metal catalyst deposited on a surface of the at least one support material, wherein: the at least one support material is made of tungsten carbide obtained from a tungstate-metal-aryl compound precursor, and the at least one metal catalyst is selected from the group consisting of Fe, Ni, Mn, Co, Cu, Zn, V, Ru, Ir, Ca, Pd, and Pt or combinations thereof, comprising:

providing an aqueous solution of at least one aryl compound, adding a solution of at least one metal salt, wherein the metal is selected from the group consisting of Fe, Ni, Mn, Co, Cu, Zn, V, Ru, Ir, Ca, Pd, and Pt to the aryl compound solution, adding a sodium tungstate solution to the aryl compound-metal solution, whereby a tungstate-metal-aryl compound precursor is precipitated, collecting the tungstate-metal-aryl compound precursor, and calcinating the tungstate-metal-aryl compound precursor at a temperature between 70° and 1100° C. to obtain the single-atom catalyst.

2. The method according to claim 1, wherein the at least one aryl compound is dopamine.

3. The method according to claim 1, wherein when two different metal salts are used, feeding amounts of the two different metal salts are adjusted to obtain different amounts and ratios of the two metals in the tungstate-metal-aryl compound precursor.

4. The method according to claim 1, wherein calcinating the tungstate-metal-aryl compound precursor is done at a temperature between 80° and 900° C.

* * * * *